United States Patent [19]

Iizuka et al.

[11] 4,071,973
[45] Feb. 7, 1978

[54] METHOD OF ARTIFICIALLY GROWING EDIBLE FUNGI

[76] Inventors: Chiyokichi Iizuka, 121 Shimizu; Masaru Takeuchi, 254 Shimizu, both of Noda, Chiba, Japan

[21] Appl. No.: 777,841

[22] Filed: Mar. 15, 1977

Related U.S. Application Data

[63] Continuation-in-part of Ser. No. 577,006, May 13, 1975, abandoned.

[51] Int. Cl.$^2$ .................................................. A01G 1/04
[52] U.S. Cl. .................................................. 47/1.1; 71/5
[58] Field of Search ................................... 47/1.1; 71/5

[56] References Cited

U.S. PATENT DOCUMENTS

| | | | |
|---|---|---|---|
| 1,833,089 | 11/1931 | Morimoto | 71/5 |
| 2,723,493 | 11/1955 | Stoller | 47/1.1 |
| 2,851,821 | 9/1958 | Guichon | 47/1.1 |
| 3,335,521 | 8/1967 | Sohm | 47/1.1 |

OTHER PUBLICATIONS

Principles & Problems ..., Lambert Botanical Review, July 1938, pp. 397–412.
Ein betrag ..., Zadrazil et al., Der Champignon, Feb. 1973, pp. 17, 27, 30, 31.

*Primary Examiner*—Robert E. Bagwill
*Attorney, Agent, or Firm*—Haseltine, Lake & Waters

[57] ABSTRACT

A method of artificially growing edible fungi by ordinarily sterilizing a nutrient medium for edible fungus cultivation, setting the edible fungus sporiferous source in the sterilized nutrient medium, culturing the inoculated original hypha until it becomes prevalent over the nutrient medium, subjecting the prevalent hypha to a high temperature treatment and a subsequent low temperature treatment and then a cool water treatment.

4 Claims, 1 Drawing Figure

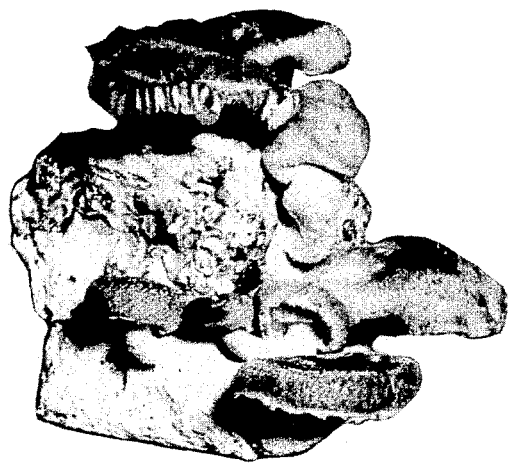

METHOD OF ARTIFICIALLY GROWING EDIBLE FUNGI

This is a continuation-in-part application of U.S. Ser. No. 577,006, filed May 13, 1975 now abandoned.

BACKGROUND OF THE INVENTION

This invention relates to a method of artificial cultivation of edible fungi by subjecting cultured edible fungus hypha which has been cultured for a certain given period to a high temperature treatment and a subsequent low temperature treatment.

The prior-art methods of growing edible fungi roughly fall into two types, namely natural cultivation and artificial cultivation. In the former type, the sporiferous source of an edible fungus is set in a log of a broad-leaved tree such as *Quercus serrata, Quercus glandilifera,* cherry, *Gagus Sieboldi,* etc. for cultivation in natural environments. In the latter type of cultivation, the source of spores is set in an artificial nutrient medium bed by mixing the sawdust of such species as *Quercus serrata, Quercus glandilifera,* cherry, *Gagus Sieboldia,* etc. and rice bran in an appropriate ratio (typically about 4:1), and after the setting of spores the bed is put in an air conditioned cultivation room for cultivation there.

In the prior-art edible fungus cultivation where the original hypha set in a nutrient medium is cultured in a cultivation room air conditioned to a constant temperature of about 18° C to 20° C, a considerable time is required before the sprouting of fruiting bodies. By way of example, in the case of shiitake (C. Shiitake P. Henn), 6 to 7 months are necessary from the setting of spores till the sprouting of fruiting bodies and collection occurs. Besides, if the fungus is cultured in a room where temperature is kept at 18° to 20° C without temperature change, the bodies of crop fungus harvested in this case lack in uniformity of size and are inferior in quality and yield 150 grams of fruiting body per 800 grams of medium.

On the other hand, using the method of the present invention, only 3 to 4 months are required for collection of the fruiting body after the seed structure was planted. Additionally, the shape and quality of the fruiting body are superior to the prior art product in quality and the method of the present invention yields 200 grams of fruiting body per 800 grams of medium.

The inventor has performed extensive investigations and experiments concerning the method of preparation of nutrient media for, as well as method of growth of various edible fungi including shiitake, particularly for the purposes of reducing the requisite culture period and obtaining an improved quality of edible fungi.

He noted a certain fact in the natural cultivation of edible fungi, that is, that many fruiting bodies of shiitake burst through the log surface on a warm day that sets in after the sudden cooling of ambient atmosphere on the previous day, due to autumn rain.

In order to make clear why this is so, the inventor conducted experiments by artificially providing similar situations.

It is well known in the art that the hyphae of edible fungi including shiitake are very susceptible to weather, and also that the membranous wall of cells of the thready or filamentous edible fungus hypha is chiefly constituted by chitin and $\beta$-1-3 glucan. These enzymes are known to be essentially composed of $\beta$-1-3 glucanase and chitinase and can cause the dissolution of the hyphal cell wall. In the meantime, with autumn rain the water content in the log upon which an edible fungus lives is increased, while due to a sudden temperature change the log itself is contracted. As a result, there sets in a sort of oxygen shortage situation, which is presumed to stimulate the hypha and promotes the metabolism of enzymes which in turn promotes the sprouting of fruiting bodies. In addition, it is thought that with the contraction of the log due to sudden temperature change the hypha within the log experiences a pressure which tends to aid the metabolism of enzymes such as the afore-mentioned $\beta$-1-3 glucanase and chitinase and also other effective components. (In addition to the afore-mentioned enzymes which are known to be present in the edible fungus hypha, the presence of other useful components is duly presumable from extensive investigations and experiments conducted by the inventor, but such useful components have not yet been definitely identified.)

Although the inventor could not determine why the metalbolism of enzymes is accelerated by cooling and applying pressure to the hypha, after various experiments and researches he has found that a rapid temperature change is an indispensable factor for the acceleration of sprouting of fruiting bodies of edible fungi.

SUMMARY OF THE INVENTION

The present invention is predicated on the above aspects, and its primary object is to widely reduce the period of cultivation of edible fungi by subjecting the hypha having been cultured in a nutrient medium to a sudden temperature change and thus inexpensively provide edible fungi of high quality to the consumer.

The fungi used in this invention are shiitake (*Lentinus edodes*) and hiratake (*Pleurotus ostheatus*).

Another object of the invention is to further reduce the cultivation period to provide high quality edible fungi more inexpensively by using a nutrient medium chiefly consisting of bagasse (dry crushed sugar cane), more particularly one prepared by mixing bagasse and sawdust in a ratio of 4 to 1 and adding other nutritive sources, in place of the conventional sawdust nutrient medium (which is prepared by mixing sawdust and rice bran in a ratio of 4 to 1).

A further object of the invention is to still further accelerate the growth of the hypha by immersing the nutrient medium containing the hypha in cool water of from 3° to 6° C after temperature treatment.

A still further object of the invention is to yet further promote the growth of the hypha and reduce the cultivation period by forcibly supplying oxygen into a polyethylene sack accommodating the nutrient medium.

BRIEF EXPLANATION OF THE DRAWING

The drawing is replaced with an accompanying picture showing fruiting bodies of shiitake grown by the method according to the invention.

DETAILED DESCRIPTION OF THE INVENTION

The nutrient medium for edible fungus cultivation to be used in accordance with the invention may be the prior-art sawdust nutrient medium chiefly consisting of sawdust or the one developed earlier by the inventor and chiefly consisting of bagasse. The bagasse nutrient medium is advantageous compared to the sawdust one because bagasse is readily and very inexpensively available and rich in air permeability and oxygen content compared to sawdust. In addition, substances that are essential to the growth of the edible fungus hypha such as ash, lignin, coarse protein and saccharose are considerably contained in bagasse. In fact, experiments prove that reduced cultivation period and improved crop quality can be achieved by using the bagasse nutrient medium.

The sawdust to be used for either nutrient medium is most suitably that of a broad-leaved tree such as *Quercus serrata, Quercus glandilifera,* cherry, *Gagus Sieboldia, Alnus japonica,* Celti Sinensis, etc., but it is possible to use that of needle-leaved species such as ground-cypress, crytomeria, pine-tree, cypress, etc. When using the needle-leaved tree sawdust, it is desirably refined by removing such harmful substances as methyl alcohol and resin acids by means of immersion in a 1-% sal soda solution for dissolution of such substances.

In the case of using the bagasse nutrient medium (consisting of bagasse and sawdust mixed together in a ratio of 4 to 1), the sole cellulose component contained in bagasse and sawdust is insufficient to ensure obtaining the sprouting of fruiting bodies and harvesting an edible fungus of high quality. Accordingly, the inventor has made efforts to find out suitable nutritive sources to be added to the bagasse-sawdust mixture. While rice bran is the major nutritive source, rice bran as fresh as possible or that free from fat is preferred. Also, it is necessary to add wheat bran as glue component to the bagasse-sawdust mixture. Further, unpolished rice powder may be added to meet lacking nutritive compositions if it is found necessary. Furthermore, nitric acid potash and "Polypeptone" may sometimes be added to the nutrient medium respectively as sources of Kali and nitrogen.

Moreover, carbonate lime may be added for the purposes of preventing the generation of various bacteria and promoting the growth of the hypha. The carbonate lime also serves to neutralize free acids liberated from rice bran and is necessary for the uniform growth of fungi.

Further, molybdenum ammonium or molybdenum soda is found to accelerate the growth of hyphae and increase the yield of an edible fungus of high quality.

The nutrient medium is previously sterilized in the usual manner before setting the sporiferous source of an edible fungus such as shiitake and hiratake in it. The sporiferous source to be used may be either in the form of solid or fluid. After the setting of the sporiferous source, the resultant nutrient medium is put in a cultivation room provided with an air conditioner for culturing the hypha there at a temperature of 18° to 20° C. Meanwhile, it is found that forcibly supplying oxygen into a polyethylene sack accommodating the nutrient medium when the medium is removed together with the sack from a plastic cultivation vessel is greatly effective in aiding the acceleration of growth of the hypha and reducing the cultivation period.

The most important feature of the cultivation method according to the invention is to give the nutrient medium covered with prevalent hypha sudden temperature changes by transferring the medium to temperature change treatment rooms. More particulary, the nutrient medium covered with prevalent hypha is subjected to a high temperature treatment at a temperature of 25° to 32° C for 24 to 48 hours and then to a low temperature treatment of 5° to 8° C for 5 to 7 days. This is done so in order to provide for the afore-mentioned oxygen shortage condition effective in promoting the metabolism of enzymes such as $\beta$-1-3 glucanase and chitinase for acceleration of the sprouting of fruiting bodies, while also permitting the hypha to experience pressure produced as the medium is contracted due to a sudden temperature change so as to further promote the metabolism of the enzymes.

In addition, as a result of experiments it has been found that by dipping the nutrient medium having been subjected to the afore-mentioned temperature change treatment in cool water of from 3° to 6° C for from 3 to 5 hours for replenishing it with water and for stimulation, the growth of the hypha can be further accelerated to greatly reduce the cultivation period.

Further, it has been found from experiments that illumination of the nutrient medium at a luminous intensity of about 50 lux during the preliminary hyphal origin culture period and an intensity of about 100 to 120 lux during the temperature change treatment is effective for the growth of the hypha.

To summarize, the present invention provides a method for artificially growing shiitake or hiratake comprising the steps of setting the edible fungus sporiferous source in a nutrient medium, culturing the inoculated original hypha in a cultivation room at a temperature of from 18° to 20° C and 60% relative humidity wherein the surface of the nutrient medium is illuminated at a luminous intensity of 30 to 50 lux until the hypha become prevalent over the nutrient medium surface, and subjecting the prevalent hypha to a high temperature treatment at between 25° to 32° C for 24 to 48 hours and then to a low temperature treatment at between 5° to 8° C for 3 to 5 days, wherein during the high and low temperature treatments of the prevalent hypha the surface of the nutrient medium were illuminated at a luminous intensity of 100 to 120 lux and oxygen is forcibly supplied into a polyethylene sack accommodating the nutrient medium when the medium is taken out together with the sack from a cultivation vessel and dipping the nutrient medium into water at a temperature of from 3° to 6° C for 24 to 48 hours and there placing the hypha in a room at 10° to 16° C having a relative humidity of 90% and recovering the fungus.

A preferred embodiment of the invention is one where the high temperature treatment is carried out at a temperature of from 25° to 28° C.

By employing the method according to the invention for growing edible fungi such as shiitake a wide reduction of the cultivation period compared to the prior-art method can be achieved. Also, the yield can be widely increased, and the crop obtainable can be very excellent in shape and quality.

The following examples of the invention are given without limiting the scope thereof:

EXAMPLE 1

80 Parts of bagasse, 20 parts of *Quercus serrata* sawdust as auxiliary constituent, 15 parts of fat-free rice brand and 2 parts of unpolished rice powder as additional nutritive source, 5 parts of wheat bran as glue component and other additives namely 0.2 part of carbonate lime, 0.3 part of nitric acid potash, 0.03 part of molybdenum soda and 0.2 part of peptone were mixed together, and water was added to the resultant mixture to prepare a nutrient medium with a water content of 65 percent. This nutrient medium was charged into a polyethylene sack, which was then closed with a cotton plug and loaded in a plastic cultivation vessel having a wide opening. The nutrient medium loaded in the cultivation vessel was then sterilized in a high pressure sterilizing oven at a temperature of 121° C for 40 to 60 minutes, followed by leaving the nutrient medium to reduce its surface temperature down to 20° C. Then, a source of spores of shiitake was set in the nutrient medium. The sporiferous source may be in the form of either solid or fluid. In the instant example, fluid spore source of shiitake was used, and 25 cc thereof was set in 800 grams of the nutrient medium. After the setting of spores, the nutrient medium was put in a cultivation room air conditioned to a temperature of 18° to 20° C and a relative humidity of 60 percent to commence the cultivation of hypha. About 15 days after the setting of spores, the nutrient medium was removed together with the polyethylene sack accommodating it from the cultivation vessel, and oxygen was forcibly supplied into the sack. Then, cultivation was continued in the cultivation room for 45 to 50 days. Toward the end of this period, the entire surface of the nutrient medium was covered with prevalent hypha. The luminous intensity of illumination in the cultivation room was set to about 30 to 50 lux. The nutrient medium with the prevalent hypha was then subjected to a temperature treatment under illumination at 100 to 120 lux and including a sudden temperature change. More particularly, the medium was first heated in a high temperature room at a temperature of 25° to 28° C for 7 to 10 days, and then it was transferred to a low temperature room for treatment at temperature of 5° to 8° C and relative humidity of 85 percent for 3 to 5 days. Thereafter, the nutrient medium was taken out of the polyethylene sack and dipped in bare state in cool water at a temperature of from 3° to 6° C for 24 to b 48 hours to replenish with water and accelerate the growth of the hypha. The bare nutrient medium after the above temperature treatment was then put in the cultivation room and left there. The cultivation room at this time was held at a temperature of 10° to 16° C and a relative humidity of 90 percent and was ventilated once for every 60 minutes. The temperature of the cultivation room was preferably 10° C at night and 16° C in the daytime. After about 10 days of confinement in the cultivation room, the nutrient medium came up with fruiting bodies sprouting through its entire surface. In the long run, each nutrient medium bed consisting of 800 grams of nutrient medium yielded about 200 grams of fruiting bodies of shiitake. The shape and quality of the crop was satisfactory. The picture substituted for the drawing shows fruiting bodies of shiitake grown by the method according to the invention.

By way of comparison, in case of cultivation using the conventional sawdust nutrient medium at a constant temperature (18° to 20° C) the yield was 150 grams per each bed consisting of 800 grams of nutrient medium. This means that according to the invention an increase of yield by about 30 percent was obtained. Besides, while the cultivaton period required from the setting of spores till the harvest was 6 to 7 months is the case of the prior-art method, by the method according to the invention it could be widely reduced to only 3 to 4 months.

EXAMPLE 2

70 Parts of bagasse, 30 parts of ground-cypress sawdust as auxiliary constituent, 15 parts of fat-free rice brand and 2 parts of unpolished rice powder as additional nutritive source, 5 parts of wheat bran as glue component and other additives namely 0.2 part of carbonate lime, 0.3 part of nitric acid potash, 0.03 part of molybdenum soda and 0.2 part of peptone were mixed together. The afore-mentioned sawdust used as auxiliary constituent had been previously immersed in a 1-% carbonate soda solution for 24 hours to remove harmful components such as methyl alcohol and resin acids through dissolution, followed by draining off the resultant solution, washing with clean water several times and removing residual water. To the mixture thus prepared water was added to produce a nutrient medium with a water content of 65 percent. This nutrient medium was charged into a polyethylene sack, which was then closed with a cotton plug and loaded in a plastic cultivation vessel having a wide opening. The nutrient medium loaded in the cultivation vessel was then sterilized in a high pressure sterilizing oven at a temperature of 121° C for 40 to 60 minutes. Then, after the surface temperature of the nutrient medium was reduced down to 20° C, sporiferous source of hiratake (*P. ostreatus* (Jacq. ex Fr.) Quél.) in the solid form was set. After the setting of spores, the nutrient medium was put in a cultivation room air conditioned to a temperature of 18° to 20° C and a relative humidity of 60 percent to commence the cultivation of hypha. About 15 days after the setting of spores, the nutrient medium was removed together with the polyethylene sack accommodating it from the cultivation vessel, and oxygen was forcibly supplied into the sack. After about 5 days of subsequent cultivation in the cultivation room, the entire surface of the nutrient medium was covered with prevalent hypha. The luminous intensity of illuminaton in the cultivation room was preferably 50 lux. The nutrient medium with the prevalent hypha was then subjected to a temperature treatment under a luminous intensity of 100 to 120 lux. More particularly, the medium was first heated in a high temperature room at a temperature of 25° to 28° C for 24 to 48 hours, and then it was transferred to a low temperature room for treatment at a temperature of 6° to 8° C and a relative humidity of 90 percent for 3 to 5 days. Thereafter, the top of the nutrient medium was exposed to the outside atmosphere by cutting away an upper portion of the polyethylene sack, and after cool water treatment at a temperature of from 3° to 6° C, it was then transferred to and left in the cultivation room, which was held at this time at a temperature of 10° to 13° C and a relative humidity of 90 percent. After about 5 days of confinement in the cultivation room, the nutrient medium came up with fruiting bodies of hiratake bursting through its top. The eventual yield of hiratake obtained was 300 grams per each bed consisting of 600 grams of nutrient medium. By way of comparison, prior-art cultivation using sawdust nutrient medium and at a constant temperature (18° to 20° C) resulted in a yield of 150 grams per each bed consisting of 600 grams of nutrient medium. Thus, according to the invention, the yield was increased by about 30 percent. Besides, while the prior-art cultivation required a cultivation period of about 45 days from the setting of spores till the harvest, by the method according to the invention only about 35 days was needed until the harvest.

EXAMPLE 3

A conventional nutrient medium prepared by mixing 80 parts of *Quercus serrata* sawdust and 20 parts of fat-free rice brand and adding water to the mixture to a water content of 65 percent was charged into a polyethylene sack, which was then closed with a cotton plug and loaded in a plastics cultivation vessel having a wide opening. The nutrient medium loaded in the cultivation vessel was then sterilized in a high pressure sterilizing oven at 121° C for 40 to 60 minutes, followed by leaving to cool. When the surface temperature of the nutrient medium was reduced down to about 20° C, shiitake spore source in the solid form was set. After the setting of spores, the nutrient medium was put in a cultivation room air conditioned to a temperature of 18° to 20° C and relative humidity of 60 percent to commence the cultivation of hypha. About 15 days after the setting of spores, the nutrient medium was removed together with the polyethylene sack accommodating it from the cultivation vessel, and oxygen was forcibly supplied into the sack. After 50 to 60 days of subsequent cultivation in the cultivation in the cultivation room, the entire surface of the nutrient medium was covered with prevalent hypha. The luminous intensity of illumination of the cultivation was preferably 50 lux. The nutrient medium with the prevalent hypha was then subjected to a temperature treatment under a luminous intensity of 100 to 120 lux. More particularly, the medium was first heated in a high temperature room at a temperature of 25° to 28° C for 24 to 48 minutes, and then it was transferred to a low temperature room for treatment at a temperature of 5° to 8° C and a relative humidity of 85 percent for 3 to 5 days. Thereafter, the nutrient medium was taken out of the polyethylene sack and dipped in cool water at a temperature of from 3° to 6° C for from 24 to 48 hours to replenish with water and accelerate the growth of the hypha. The nutrient medium after the above temperature treatment was then put in the cultivation room which was held at this time at a temperature of 10° to 16° C and a relative humidity of 90 percent and ventilated once for every 60 minutes. The temperature of the cultivation room was preferably 10° C at night and 16° C in the daytime. After about 15 days of confinement in the cultivation room, the nutrient medium came up with fruiting bodies sprouting through the entire surface of the nutrient medium. As the eventual yield, about 180 grams of fruiting bodies of shiitake was harvested from each bed consisting of 500 grams of nutrient medium, and the crop was satisfactory in shape and had high quality.

In this example, in which the conventional sawdust nutrient medium for cultivation of fungi was used, the attained cultivation period and yield were slightly inferior to the cultivation using bagasse nutrient medium.

What we claim is:

1. A method for artificially growing shiitake or hiratake comprising the steps of setting the edible fungus sporiferous source in a nutrient medium, culturing the inoculated original hypha in a cultivation room at a temperature of from 18° to 20° C and 60% relative humidity wherein the surface of the nutrient medium is illuminated at a luminous intensity of 30 to 50 lux until the hypha become prevalent over the nutrient medium surface, and subjecting the prevalent hypha to a high temperature treatment at between 25° to 32° C for 24 to 48 hours and then to a low temperature treatment at between 5° to 8° for 3 to 5 days, wherein during the high and low temperature treatments of the prevalent hypha the surface of the nutrient medium were illuminated at a luminous intensity of 100 to 120 lux and oxygen is forcibly supplied into a polyethylene sack accomodating the nutrient medium when the medium is taken out together with the sack from a cultivation vessel and dipping the nutrient medium into water at a temperature of from 3° to 6° C for 24 to 48 hours and then placing the hypha in a room at 10° to 16° C having a relative humidity of 90% and recovering the fungus.

2. The method of artificially growing edible fungi according to claim 1, wherein the high temperature treatment is carried out at a temperature of 25° to 28° C.

3. The method of artificially growing edible fungi according to claim 1, wherein a nutrient medium chiefly composed of bagasse and containing sawdust and other nutritive sources is used for the cultivation.

4. The method of artificially growing edible fungi according to claim 1, wherein a nutrient medium composed of sawdust and rice bran is used for the cultivation.

* * * * *